(12) United States Patent
Sun et al.

(10) Patent No.: US 12,415,918 B2
(45) Date of Patent: Sep. 16, 2025

(54) POLYVINYL ALCOHOL-BASED DEGRADABLE PLASTIC, PREPARATION METHOD THEREFOR AND APPLICATION THEREOF, AND RECYCLING METHOD THEREFOR

(71) Applicant: JILIN UNIVERSITY, Jilin (CN)

(72) Inventors: Junqi Sun, Jilin (CN); Xu Fang, Jilin (CN); Yixuan Li, Jilin (CN)

(73) Assignee: JILIN UNIVERSITY, Changchun (CN)

( * ) Notice: Subject to any disclaimer, the term of this patent is extended or adjusted under 35 U.S.C. 154(b) by 716 days.

(21) Appl. No.: 17/634,560

(22) PCT Filed: Aug. 27, 2020

(86) PCT No.: PCT/CN2020/111580
§ 371 (c)(1),
(2) Date: Feb. 11, 2022

(87) PCT Pub. No.: WO2021/037100
PCT Pub. Date: Mar. 4, 2021

(65) Prior Publication Data
US 2022/0275192 A1     Sep. 1, 2022

(30) Foreign Application Priority Data
Aug. 27, 2019   (CN) .......................... 201910795694.5

(51) Int. Cl.
*C08L 29/04*   (2006.01)
*C08F 261/04*  (2006.01)
*C08J 11/08*   (2006.01)

(52) U.S. Cl.
CPC ............ *C08L 29/04* (2013.01); *C08F 261/04* (2013.01); *C08J 11/08* (2013.01); *C08J 2329/04* (2013.01); *C08L 2201/06* (2013.01)

(58) Field of Classification Search
CPC ........ C08F 216/06; C08F 261/04; C08F 8/28; C08J 11/08; C08J 2329/04; C08L 2201/06; C08L 29/02; C08L 29/04; C08L 29/14
See application file for complete search history.

(56) References Cited

FOREIGN PATENT DOCUMENTS

| GB | 1433726 A    | 4/1976 |
| JP | S5512171 A   | 1/1980 |
| JP | 2008069235 A | 3/2008 |
| JP | 2010070718 A | 4/2010 |

OTHER PUBLICATIONS

Oct. 29, 2020 International Search Report issued in International Patent Application No. PCT/CN2020/111580.
Oct. 29, 2020 Written Opinion of the International Searching Authority issued in International Patent Application No. PCT/CN2020/111580.
May 18, 2023 Second Office Action issued in Chinese Patent Application No. 201910795694.5.
Nov. 25, 2022 Chinese Office Action issued in Chinese Priority Application No. 201910795694.5.
Sustainable Polyvinyl Acetals from Bioaromatic Aldehydes, Mayra Rostagno et al., The Royal Society of Chemistry, vol. 8, pp. 5049-5059, Mar. 24, 2017.

*Primary Examiner* — Ana L. Woodward (57) ABSTRACT

Disclosed in the present invention are a polyvinyl alcohol (PVA)-based degradable plastic, a preparation method therefor and application thereof, and a recycling method therefor. The preparation method comprises the following steps: a PVA solution is subjected to a chemical grafting reaction under an acidic condition under the action of a modifier; there are a phenyl group, an aldehyde group, and at least one group capable of forming a hydrogen bond with PVA in a structural formula of the modifier. The polyvinyl alcohol-based degradable plastic provided in the present invention has the advantages of being high in transparency, high in mechanical strength, not affected by environmental humidity, easy to degrade, good in thermal stability and good in biocompatibility, and has the advantages of recyclability, low costs, easy large-scale preparation and the like.

10 Claims, 6 Drawing Sheets

POLYVINYL ALCOHOL-BASED DEGRADABLE PLASTIC, PREPARATION METHOD THEREFOR AND APPLICATION THEREOF, AND RECYCLING METHOD THEREFOR

The present application is a National Stage of International Application No. PCT/CN2020/111580, filed on Aug. 27, 2020, which claims priority of the Chinese Patent Application No. CN2019107956945 filed on Aug. 27, 2019, the contents of which are incorporated herein by reference in their entireties.

TECHNICAL FIELD

The present disclosure relates to a polyvinyl alcohol-based degradable plastic, a preparation method therefor and application thereof, and a recycling method therefor.

BACKGROUND

Since the advent of plastic, while it has brought convenience to the human life, the white pollution caused by it has become the primary problem that plagues the global environment. Today, 275 million tons of plastic waste is produced every year over the world, and it is expected that this value will exceed 500 million tons by 2050. Most plastics are expensive to be recycled and are difficult to degrade in a short period of time. Only less than 10% of plastic is recycled and reused. With this accumulation, more and more plastic wastes have brought great pressure to the environment and ecology. Although several types of plastic with degradable properties have been developed, they still have many problems in practical applications. Taking the commonly used polylactic acid (PLA) degradable plastic as an example, the degradation of PLA needs to undergo a hydrolysis reaction and then be decomposed by microorganisms, wherein the hydrolysis needs to meet the two most basic conditions: a humidity of 50%-60% and a temperature of 50-70 degrees Celsius. Only under these conditions, the degradation can be achieved relatively quickly. In the natural environment, if the conditions of high temperature and humidity are not met, the degradation rate of PLA will be very slow. The light and heat in the natural environment can decompose the photodegradable plastic into small molecules, but in the absence of light, such as being buried in the soil, the photodegradable plastic cannot be degraded.

Water-soluble polyvinyl alcohol (PVA) is the only vinyl polymer that can be used by bacteria as carbon source and energy source, which is a biodegradable polymer material with good biocompatibility. It can be produced on a large scale by non-petroleum routes with low price, and has unique advantages in food and pharmaceutical packaging. Although the water-soluble PVA film has excellent mechanical properties and degradable functions, the water-soluble properties of this type of material greatly limit its application fields. At present, the mechanical strength of PVA-based plastics is greatly reduced in a humid environment, so that they cannot be used.

In the prior art, using glutaraldehyde and formaldehyde to chemically crosslink PVA can effectively improve the strength and water resistance of PVA. However, the water resistance of the PVA material prepared by this method still needs to be improved, and its stretchability is greatly reduced, and it is very difficult to be completely degraded under mild natural conditions.

Content of the Present Invention

The technical problem to be solved in the present disclosure is for overcoming the disadvantage that the mechanical strength of the PVA-based plastic in the prior art is greatly reduced in the humid environment, so that it cannot be used, and the existing modification method makes the degradation performance worse, to provide a polyvinyl alcohol-based degradable plastic, a preparation method therefor and application thereof, and a recycling method therefor. The polyvinyl alcohol-based degradable plastic provided by the invention has the advantages of high transparency, high mechanical strength, being not affected by environmental humidity, very easy degradation, good thermal stability, good biocompatibility, recyclability, low price, easy large-scale preparation and the like.

The present invention provides a preparation method for a polyvinyl alcohol-based degradable plastic, wherein the preparation method comprises the following steps: the PVA solution is subjected to a chemical grafting reaction under an acidic condition and under the action of a modifier; there are a phenyl group, an aldehyde group and at least one group capable of forming a hydrogen bond with PVA in a structural formula of the modifier; the aldehyde group and the group capable of forming a hydrogen bond with PVA respectively substitute the hydrogen on the different carbon atoms of the phenyl group; the mole percentage of the modifier with respect to a repeating structural unit (i.e. —$C_2H_4O$—) of the PVA is 15% to 60%.

In the present invention, the molecular weight of the modifier is preferably 106-300.

In the present invention, in the structural formula of the modifier, the aldehyde group and the group capable of forming a hydrogen bond with PVA may respectively substitute the hydrogen on the different carbon atoms on the phenyl group by using any types of substitution, that is, ortho, meta or para substitution, and meta or para substitution is preferred.

In the present invention, the group capable of forming a hydrogen bond with PVA has conventional meanings in the art, which is preferably one or more selected from the group consisting of hydroxyl, methoxy, ethoxy, fluoro, carboxy, dimethylamino, methoxycarbonyl, and methyl. More preferably, the modifier is one or more selected from the group consisting of p-hydroxybenzaldehyde, 3,4-dihydroxybenzaldehyde, vanillin, ethyl vanillin, 4-fluorobenzaldehyde, p-aldehyde benzoic acid, m-aldehyde benzoic acid, 4-dimethylaminobenzaldehyde, methyl p-formyl benzoate and p-methylbenzaldehyde, and more preferably p-aldehyde benzoic acid, or methyl p-formyl benzoate, or m-aldehyde benzoic acid, or a combination of p-methylbenzaldehyde and ethyl vanillin.

The mechanism of the present invention is that the active group in the modifier is an aldehyde group, which is used for cross-linking reaction with PVA to form an acetal structure, and the phenyl group and the group capable of forming a hydrogen bond with PVA together form a hydrophobic group. The supramolecular force in the polyvinyl alcohol-based degradable plastic obtained in the present invention is derived from the hydrophobic interaction of the entire hydrophobic group on the one hand, and from the hydrogen bonding interaction between the special group on the phenyl group and PVA on the other hand. The hydrophobic interaction and hydrogen bonding interaction are synergistic with each other.

In the present invention, the mole percentage of the modifier with respect to a repeating structural unit (i.e.

—C$_2$H$_4$O—) of the PVA can be understood as the concept of grafting rate or grafting molar ratio. In the preferred embodiments of the present application, the molar percentages of the modifiers with respect to a repeating structural unit of the PVA are respectively 15%, 20%, 30%, 40%, 50%, 60%. Preferably, the molar percentage of the modifier with respect to a repeating structural unit of the PVA is 20%-40%.

In a preferred embodiment of the present application, p-aldehyde benzoic acid is used as the modifier, and the molar percentage of the modifier with respect to a repeating structural unit of the PVA is preferably 20%-40%. The reaction formula of the chemical grafting reaction is shown in the following formula:

In a preferred embodiment of the present application, methyl p-formylbenzoate is used as the modifier, and the mole percentage of the modifier with respect to a repeating structural unit of the PVA is preferably 20%-40%. The reaction formula of the chemical grafting reaction is shown in the following formula:

In another preferred embodiment of the present application, m-aldehyde benzoic acid is used as the modifier, and the mole percentage of the modifier with respect to a repeating structural unit of the PVA is preferably 20%-40%.

In another preferred embodiment of the present application, a mixture of p-tolualdehyde and ethyl vanillin is used as the modifier, wherein the molar ratio of p-tolualdehyde and ethyl vanillin is preferably 1:1-1:3. The reaction formula of the chemical grafting reaction is shown in the following formula:

In the present invention, the PVA solution has a conventional meaning in the art, and refers to a solution obtained by dissolving PVA in a soluble solvent. The mass percentage of PVA in PVA solution is preferably 6%-11%.

In the present invention, PVA is a conventional raw material in the art, and its molecular weight is preferably 40,000 to 140,000. In a preferred embodiment of the present application, PVA is purchased from Aladdin Company and has a molecular weight of 70,000.

Wherein, the soluble solvent is a conventional solvent capable of dissolving PVA in the art, such as dimethyl sulfoxide (DMSO), or a mixed solvent formed by dimethyl sulfoxide (DMSO) and water. In the mixed solvent, the volume ratio of DMSO and water in the mixed solvent is preferably 3:1-5:1.

Wherein, the dissolving is preferably carried out at 70-90° C., more preferably at 70° C.

In the present invention, the acidic condition is preferably a strong acidic condition, and more preferably an acidic condition with pH of 3 or less. For example, in a preferred embodiment of the present application, the acidic condition refers to an acidic condition with pH of 1; the acidic condition is achieved by using a pH regulator, and the pH regulator used is hydrochloric acid.

In the present invention, the conditions for the chemical grafting reaction may be the conventional conditions for chemically crosslinking PVA in the art. The temperature of the chemical grafting reaction is preferably 70-90° C., more preferably 70° C. The time of the chemical grafting reaction is preferably 1-3 h, more preferably 2 h.

In the present invention, after the chemical grafting reaction, a post-treatment is preferably performed, and the post-treatment preferably comprises carrying out drying in form of coating film or melt-blowing film forming for the reaction solution. The conditions for the drying in form of coating film are conventional conditions in the art, the temperature is preferably 60-120° C., and the drying time is preferably 10 min-30 min. The conditions for melt-blowing film forming are conventional conditions in the art, and the temperature is preferably 160-190° C.

In a preferred embodiment of the present application, the preparation method for polyvinyl alcohol-based degradable plastic is: PVA is dissolved in an organic solvent DMSO or a mixed solvent of DMSO and water at 90° C. and the mass percentage of PVA in the obtained PVA solution is 6%-11%, then the solution is heated to 70-90° C., the pH of the solution is adjusted to 1, and then one or two of the modifiers are added to the solution, the mole percentage of grafting is 20-40%, and the reaction is carried out for two hours to obtain a solution of PVA modified with supramolecular force groups; then the solution is dried in form of coating film to obtain a polyvinyl alcohol-based degradable plastic.

The invention also provides a polyvinyl alcohol-based degradable plastic prepared by the above preparation method.

The present invention introduces a group with supramolecular force onto the PVA chain through a simple one-step chemical modification at room temperature, based on the synergy of the multiple supramolecular forces between the modified group and the PVA chain, to prepare a high-strength PVA-based degradable plastic that can be degraded in soil and seawater.

The present invention also provides an application of the above-mentioned polyvinyl alcohol-based degradable plastic.

The polyvinyl alcohol-based degradable plastic prepared by the invention can replace daily-used plastic products, such as handbags and packaging bags. The form of the plastic may be a plastic film or a plastic thin film.

Compared with the traditional PVA plastic thin film, the PVA-based degradable plastic has improved the mechanical properties, and the most important thing is that it greatly expands the scope of application of the PVA materials. For example, PVA film has good performance and can be degraded and can be made into various plastic products, but it dissolves in water and cannot be used in a humid environment, so it cannot replace the existing non-degradable, non-environmentally friendly plastic products. However, the polyvinyl alcohol-based degradable plastics not only have good mechanical properties, but also have high stability and degradability.

The present invention also provides a recycling method for polyvinyl alcohol-based degradable plastics, which comprises the following steps: completely dissolving the polyvinyl alcohol-based degradable plastic in a soluble solvent.

Wherein, the soluble solvent is a conventional solvent capable of dissolving PVA in the art, such as dimethyl sulfoxide (DMSO), or a mixed solvent formed by dimethyl sulfoxide (DMSO) and water. In the mixed solvent, the volume ratio of DMSO and water is preferably 3:1-5:1.

Wherein, the dissolving is performed under conventional conditions in the art, such as room temperature (generally 5-40° C.).

In the present invention, after the completely dissolving, preferably, a post-treatment is further performed; the post-treatment is preferably to carry out dry in form of coating film or melt-blowing film forming for the solution obtained after completely dissolving. The conditions for drying in form of coating film are conventional conditions in the art, the temperature is preferably 60-120° C., and the drying time is preferably 10 min-30 min. The conditions for melt-blowing film forming are conventional conditions in the art, and the temperature is preferably 160-190° C.

On the basis of conforming to common knowledge in the art, the above-mentioned preferred conditions can be combined arbitrarily to obtain preferred embodiments of the present invention.

The reagents and raw materials used in the present invention are all commercially available.

The positive and progressive effects of the present invention are:

The polyvinyl alcohol-based degradable plastic with good flexibility prepared by the invention has a fracture strength which can reach 47 MPa, and a transmittance in visible light region not less than 98%, and it can be completely degraded in alkaline water, seawater and soil, and can be completely degraded in alkaline water, seawater and soil, but it can maintain high mechanical strength in fresh water and satisfies the performance of PVA-based degradable plastic in high humidity environments.

BRIEF DESCRIPTION OF THE DRAWINGS

FIG. 1 (b) shows the test result of the transmittance in visible light region of the polyvinyl alcohol-based degradable plastic of Example 1.

DETAILED DESCRIPTION OF THE PREFERRED EMBODIMENT

The following examples further illustrate the present disclosure, but the present disclosure is not limited thereto to the scope of the described examples. In the following examples, the experimental methods without specific conditions are selected according to conventional methods and conditions, or according to the product specification.

The raw materials in the following examples, PVA powder was purchased from Aladdin Company, with a molecular weight of 70,000.

Example 1

In Example 1, the preparation method of polyvinyl alcohol-based degradable plastic is: PVA was dissolved in organic solvent DMSO at 90° C. with a mass percentage of 6%, then the solution was heated to 70° C., and the pH of the solution was adjusted to 1 by using hydrochloric acid, then the modifier para-aldehyde benzoic acid was added to the solution, with a grafting mole percentage of 20%, and the reaction was carried out for two hours to obtain the solution of PVA modified with supramolecular force groups; then the solution was dried in form of coating film (drying conditions: 80° C., 20 min) to obtain a polyvinyl alcohol-based degradable plastic (hereafter also referred to as "PVA-based supramolecular plastic") thin film with a thickness of 30 microns.

Effect Example 1

Figure 1A:
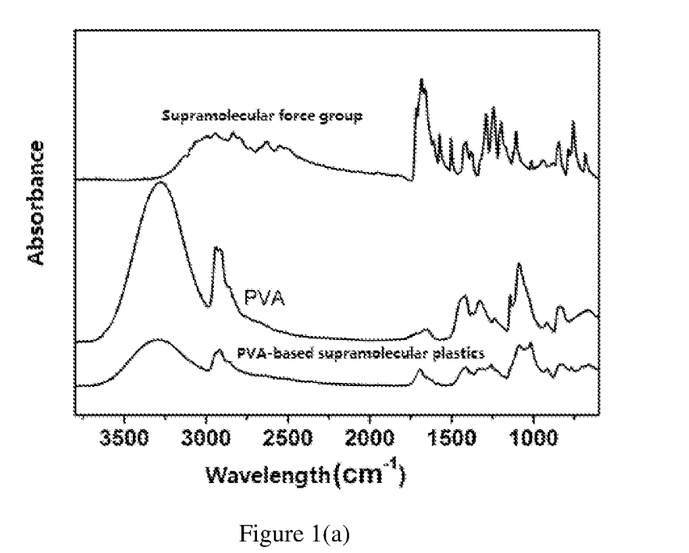
FIG. 1(a) shows the infrared spectrum of the polyvinyl alcohol-based degradable plastic of Example 1.

This effect example is mainly for testing performance of the polyvinyl alcohol-based degradable plastic thin film prepared in Example 1, comprising the following:
Infrared Detection:

Infrared detection was performed on the degradable plastic with a thickness of 30 microns obtained in Example 1. As shown in FIG. 1(*a*), the result showed that the new infrared peak of the PVA-based degradable plastic at the wavelength of 1017 $cm^{-1}$ is the infrared characteristic peak of acetal (which is the product obtained by the condensation of one molecule of aldehyde and two molecules of alcohol), which proves the success of the acetal reaction and thus reflects the success of the grafting reaction.

In FIG. 1(*a*), the sample of "supramolecular force group" represents the modifier para-aldehyde benzoic acid used in Example 1, and the sample of "PVA" represents a PVA thin film with a thickness of 30 microns, which is made by dissolving commercially available PVA powder and then drying it to form a form, wherein the film-forming process by drying is the same as the film-forming process by drying in Example 1.

Figure 1B:
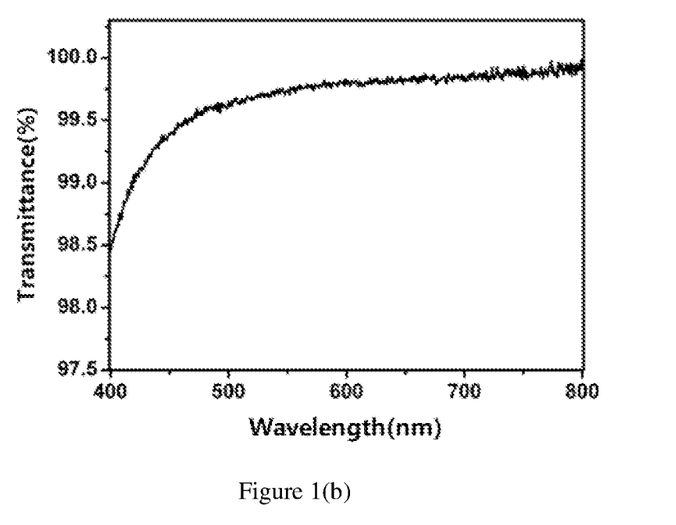
Figure 2:
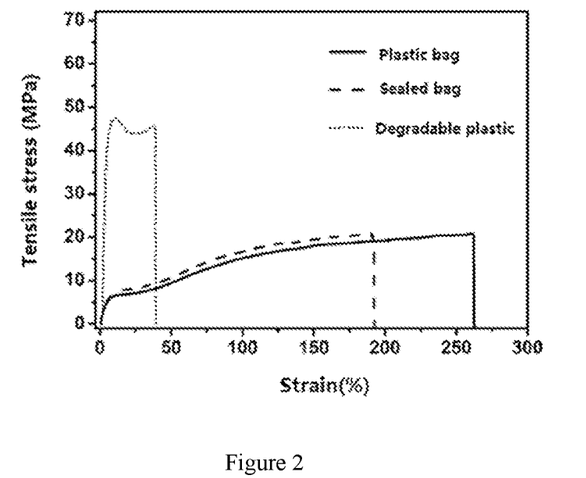
FIG. 2 shows the test result of the mechanical properties of the polyvinyl alcohol-based degradable plastic of Example 1.
Figure 3:
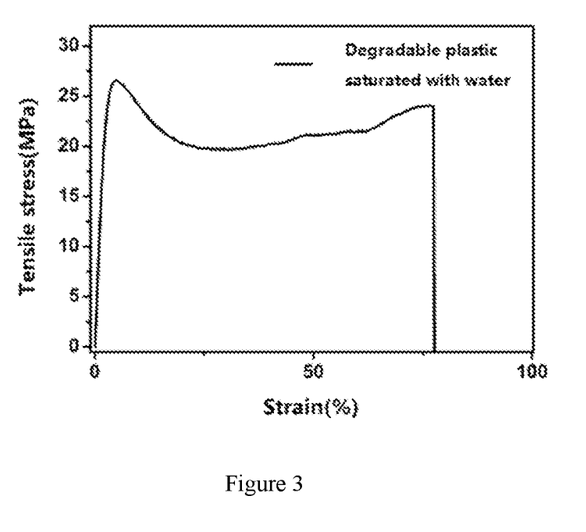
FIG. 3 shows the test result of mechanical properties of the polyvinyl alcohol-based degradable plastic of Example 1 after being saturated with water.

Light Transmittance Detection:

The degradable plastic obtained in Example 1 was also tested for light transmittance, as shown in FIG. 1(*b*). The results show that the transmittance of more than 98% can be maintained in the visible light region.
Mechanical Performance Test:

The mechanical performance of the degradable plastic with a thickness of 30 microns obtained in Example 1 was also tested, meanwhile, a daily-used polyethylene plastic bag with a thickness of 30 microns and a polyethylene sealed bag with a thickness of 30 microns were tested for comparison, as shown in FIG. 2, the results show that the tensile strength of the degradable PVA-based supramolecular plastic is about 47 MPa, and the modulus is as high as 400 MPa (calculated based on the slope of the curve in the figure). Compared with the daily-used polyethylene plastic bags (tensile strength is about 21 MPa) and sealed bags (tensile strength is about 23 MPa), the degradable plastic has a huge improvement in strength.
Load Detection:

The degradable plastic with a thickness of 30 microns obtained in Example 1 was tested for its load-bearing performance, and the specific method was as follows: using plastic to lift a weight of 2 kg from the bottom, and the result showed that the degradable plastic was intact.
Mechanical Performance Test after being Saturated with Water:

FIG. 3 shows that the degradable PVA-based supramolecular plastic obtained in Example 1 has excellent stability in fresh water, after being saturated with water, the water content is only 9 wt % and the tensile strength is about 26 MPa, which is still higher than the tensile strength (about 21 MPa) of the daily-used polyethylene plastic bags, and commercial PVA thin films will dissolve in water when it meets with water. It shows that the degradable PVA-based supramolecular plastic of the present invention still has better performance than the commercialized PVA thin film after being saturated with water.
Degradation Performance Test:

The degradation performance test of the polyvinyl alcohol-based degradable plastic obtained in Example 1 shows that:

Polyvinyl alcohol-based degradable plastic with a thickness of 30 microns was completely dissolved in an alkaline aqueous solution (sodium hydroxide solution with pH of 12) in 1 minute at room temperature.

PVA-based degradable plastic with a thickness of 30 microns was cut into small pieces of uniform size, about 2 cm*3 cm*30 microns, which were weighed separately and then buried in the soil. After two days, the quality was reduced by 12%, after one week, the quality was reduced by 29%, after two weeks, the quality was reduced by 76%, and after 20 days, it was completely degraded in the soil.

PVA-based degradable plastic with a thickness of 30 microns became a sol state in seawater in three days and was completely degraded in ten days.

Figure 4:
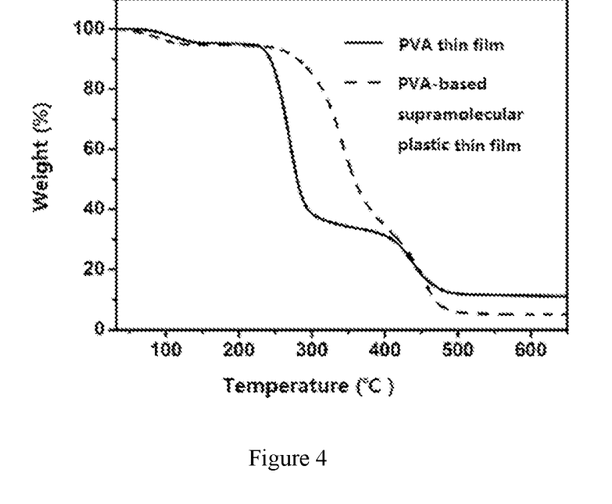
FIG. 4 shows the comparison result of the thermal stability of the polyvinyl alcohol-based degradable plastic of Example 1 and the PVA thin film.

It shows that the degradable PVA-based supramolecular plastic can be completely degraded in an alkaline aqueous solution at room temperature, and even the supramolecular plastic can be completely degraded in soil and seawater.
Thermal Stability Test:

FIG. 4 shows a comparison result of the thermal stability of the polyvinyl alcohol-based degradable plastic of Example 1 and the PVA thin film. Wherein, the PVA thin film was made by dissolving commercially available PVA powder and then drying it to form a film, and the film-forming process by drying was the same as that of Example 1, and the thickness of the two thin film samples used for testing were both 30 microns.

According to FIG. 4, PVA begins to decompose at 226° C., and supramolecular plastic begins to decompose around 265° C., the decomposition temperature increases by 39° C.; supramolecular plastic is particularly stable below 100° C. FIG. 4 shows that degradable PVA-based supramolecular plastic have better thermal stability than PVA thin film.

Figure 5:
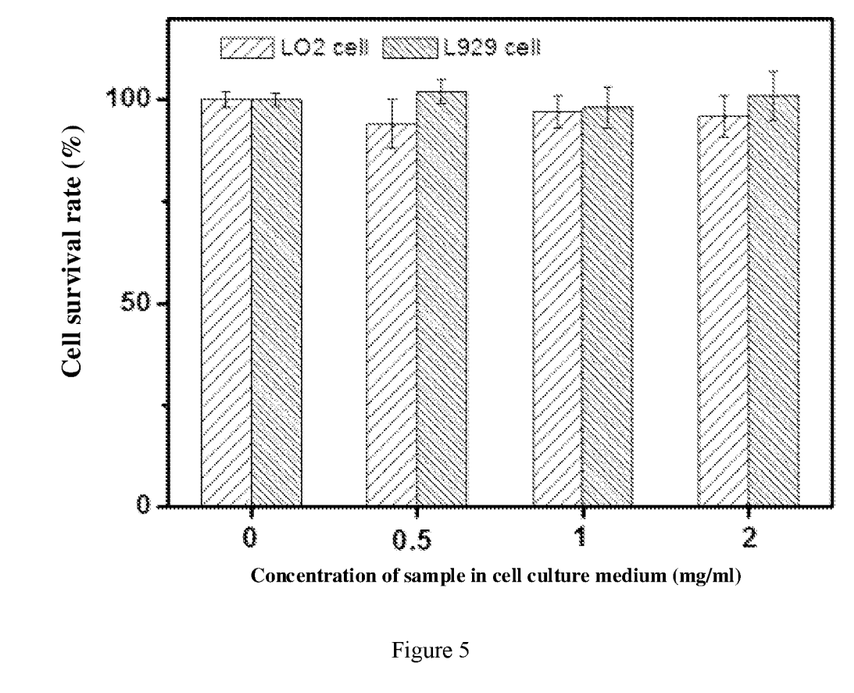
FIG. 5 shows the test result of biocompatibility of the polyvinyl alcohol-based degradable plastic of Example 1.
Figure 6:
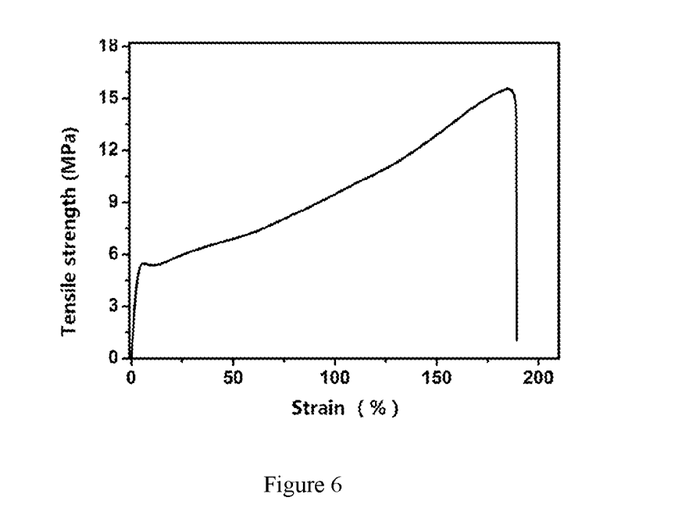
FIG. 6 shows the test result of the mechanical performance of the polyvinyl alcohol-based degradable plastic of Example 2 after being saturated with water (grafting rate 15%).
Figure 7:
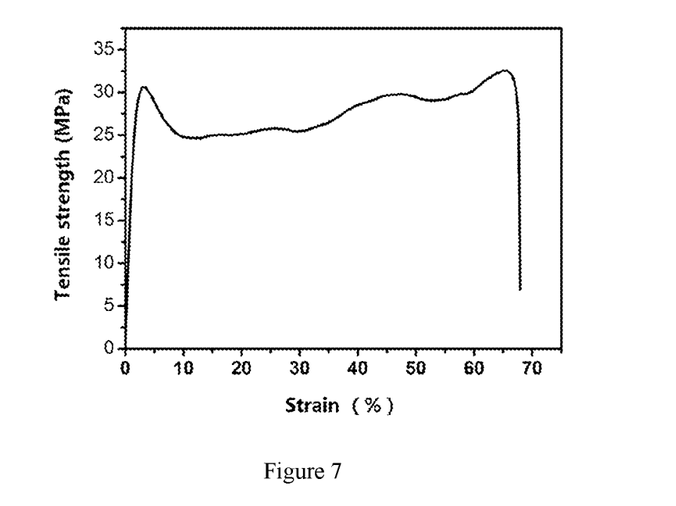
FIG. 7 shows the test result of the mechanical performance of the polyvinyl alcohol-based degradable plastic of Example 3 after being saturated with water (grafting rate 30%).
Figure 8:
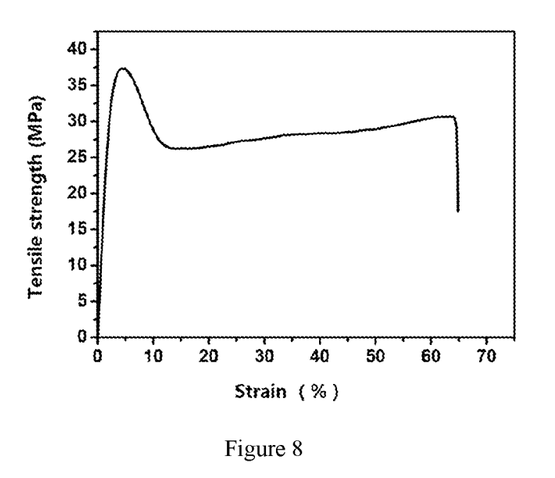
FIG. 8 shows the test result of the mechanical performance of the polyvinyl alcohol-based degradable plastic of Example 4 after being saturated with water (grafting rate 40%).

Biocompatibility Test:

The supramolecular plastic with a thickness of 30 microns obtained in Example 1 were cut into small pieces of a certain quality, and soaked in a certain volume of cell culture medium for 5 days to obtain cell culture medium with different concentrations (specific concentrations were set according to the standard as shown in FIG. 5, a control group with the concentration of 0 mg/mL, and experimental groups with the concentrations of 0.5, 1, 2 mg/mL respectively were set), and then the culture medium was used to culture human normal liver cells (LO2 cell), mouse fibroblasts (L929 cells). After 72 hours of culturing, the activity of the cells was observed and counted to reflect the cytotoxicity of supramolecular plastic.

The results are shown in FIG. 5, the results show that normal human hepatocytes and mouse fibroblasts maintain a high survival rate in the culture medium without supramolecular plastic (corresponding to a control group with a concentration of 0 mg/mL) and in the culture medium with supramolecular plastic (corresponding to the experimental groups with concentrations of 0.5, 1, 2 mg/mL), above 95%, proving that supramolecular plastics are basically non-cytotoxic.

Recyclability Test:

The specific steps are as follows: the polyvinyl alcohol-based degradable plastic with a thickness of 30 microns obtained in Example 1 was further cut into fragments, dissolved in DMSO at room temperature, and then the film-forming process by drying in Example 1 was re-operated to obtain recycled product. After testing, the performance of the recycled product was exactly the same as that of the raw material before recycling (the polyvinyl alcohol-based degradable plastic obtained in Example 1).

It shows that, compared with the degradable material based on covalent bonds, the degradable supramolecular material prepared by the present invention based on supramolecular force has a faster degradation rate and milder degradation conditions, and also has fast and efficient fracture-recombination performance, because the internal force is a weak interaction force, so it is recyclable.

Examples 2-6

On the basis that the raw materials for preparation, the process steps and the conditions were the same as those in Example 1, the test results of experiments with the grafting rate (15%, 30%, 40%, 50%, 60%, respectively) as the only variable were investigated. The water absorption saturation rate and the strength data after being saturated with water of the PVA-based supramolecular plastic prepared in each example are shown in Table 1 below and shown in FIGS. 6-10.

TABLE 1

Performance comparison between Examples 1-6 and Comparative Example 1

| Samples | Grafting rate (%) | Water absorption saturation rate (wt %) | Strength after being saturated with water (MPa) |
|---|---|---|---|
| Examples 1 | 20 | 9 | 26 |
| Examples 2 | 15 | 60 | 15.5 |
| Examples 3 | 30 | 6 | 32.5 |
| Examples 4 | 40 | 3 | 37.5 |
| Examples 5 | 50 | 2 | 42 |
| Examples 6 | 60 | 0.5 | 63 |
| Comparative Example 1 | 10 | 75 | 2.7 |

It is noted that although the tensile strength corresponding to the grafting rate of 15% in Example 2 cannot reach the tensile strength of the daily used polyethylene plastic bags (about 21 MPa), the tensile strength can also meet the basic use requirements, and perfectly overcome the defect that polyethylene plastic bags cannot be degraded.

Figure 9:
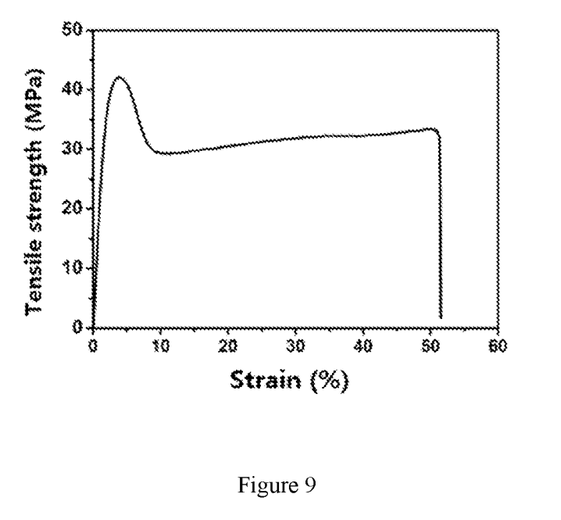
FIG. 9 shows the test result of the mechanical performance of the polyvinyl alcohol-based degradable plastic of Example 5 after being saturated with water (grafting rate 50%).

When the grafting rate is 50%, the water content of the PVA-based supramolecular plastic obtained after being saturated with water is only 2%, as shown by the tensile data, the tensile strength of the material after being saturated with water is 42 MPa (the result is shown in FIG. 9). It can be seen that although increasing the grafting rate can further improve the stability of the material in water, increasing the grafting rate means that more raw materials are consumed, and the PVA-based supramolecular plastic with a grafting rate of 50% shows a certain yellow color.

Figure 10:
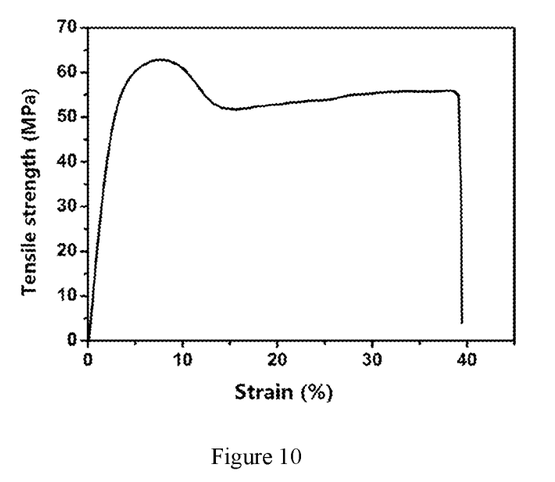
FIG. 10 shows the test result of the mechanical performance of the polyvinyl alcohol-based degradable plastic of Example 6 after being saturated with water (grafting rate 60%).

When the grafting rate is 60%, although the strength of the material after being saturated with water is further improved (the result is shown in FIG. 10), the diseconomy caused by raw material consumption and yellowness are more serious than the case where the grafting rate is 50%.

In contrast, the supramolecular plastic with a grafting rate of 20-40% not only has high mechanical strength and water resistance, but also has high transparency and relatively low production costs.

In addition, the degradable plastic with a thickness of 30 microns obtained in Examples 2-6 was respectively subjected to infrared detection, light transmittance detection, load detection, degradation performance test, and thermal stability test, biocompatibility test and recyclability test as shown in Effect Example 1, the results show that the effects can reach the level equivalent to the effects of Example 1.

Comparative Example 1

On the basis that the raw materials for preparation, the process steps and the conditions were the same as in those Example 1, the comparison results of the experiments with the grafting rate as the only variable were investigated.

Figure 11:
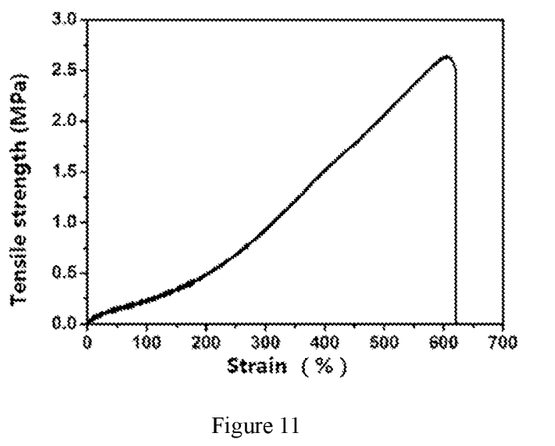
FIG. 11 shows the test result of the mechanical performance of the polyvinyl alcohol-based degradable plastic of Example 1 after being saturated with water (grafting rate 10%).

When the grafting rate is 10%, the water content of the PVA-based supramolecular plastic after being saturated with water is as high as 75%, as shown by the tensile data, the tensile strength of the material after being saturated with water is low, only 2.7 MPa (the result is shown in the FIG. 11 and Table 1), that is to say, the PVA-based supramolecular plastic with a grafting rate of 10% becomes very soft after absorbing water and cannot fully meet the needs for daily use.

Example 7

On the basis that the raw materials for preparation, the process steps and the conditions are the same as those in Example 1, the test results of the experiment with modifier type (the modifier specifically used in this example is m-aldehyde benzoic acid) as the only variable were investigated.

The degradable plastic with a thickness of 30 microns obtained in this example was respectively subjected to infrared detection, light transmittance detection, load detection, mechanical performance detection after being saturated with water, degradation performance test, thermal stability test, biocompatibility testing and recyclability testing as shown in Effect Example 1, and the results show that the effects can reach the level equivalent to the effects of Example 1.

Example 8

On the basis of that the raw materials for preparation, the process steps and conditions are the same as those in Example 1, the test results of the experiment with the modifier type (the modifier specifically used in this example is a mixture of methyl benzaldehyde and ethyl vanillin, wherein the molar ratio of p-methyl benzaldehyde and ethyl vanillin is 1:1) as the only variable were investigated.

The degradable plastic with a thickness of 30 microns obtained in this embodiment was respectively subjected to infrared detection, light transmittance detection, load detection, mechanical performance detection after being saturated with water, degradation performance test, thermal stability test, biocompatibility testing and recyclability testing as shown in Effect Example 1, and the results show that the effects can reach the level equivalent to the effects of Example 1.

Example 9

On the basis that the raw materials for preparation, process steps and conditions are the same as those in Example 1, the test results of the experiment with the modifier type (the modifier specifically used in this example is methyl p-formyl benzoate) as the only variable were investigated.

The degradable plastic with a thickness of 30 microns obtained in this embodiment was respectively subjected to infrared detection, light transmittance detection, load detection, mechanical performance detection after being saturated with water, degradation performance test, thermal stability test, biocompatibility testing and recyclability testing as shown in Effect Example 1, and the results show that the effects can reach the level equivalent to the effects of Example 1.

What is claimed is:

1. A preparation method for polyvinyl alcohol-based degradable plastic, wherein the preparation method comprises the following step: a polyvinyl alcohol solution is subjected to a chemical grafting reaction under an acidic condition and under the action of a modifier; the modifier is p-aldehyde benzoic acid; the mole percentage of the modifier with respect to a repeating structural unit of polyvinyl alcohol is 20%-30%; wherein, the temperature of the chemical grafting reaction is 70-90° C.; and the time of the chemical grafting reaction is 1-3 h, the mass percentage of polyvinyl alcohol in the polyvinyl alcohol solution is 6%-11%; the molecular weight of polyvinyl alcohol is 70000; and the acidic condition is an acidic condition with pH of 1, wherein the chemical grafting reaction results in a reaction solution.

2. The preparation method according to claim 1, wherein the polyvinyl alcohol solution is a solution obtained by dissolving polyvinyl alcohol in a soluble solvent.

3. The preparation method according to claim 2, wherein, the soluble solvent is dimethyl sulfoxide, or a mixed solvent formed by dimethyl sulfoxide and water.

4. The preparation method according to claim 2, wherein, the dissolving is carried out at 70-90° C.

5. The preparation method according to claim 1, wherein the acidic condition is achieved by using a pH regulator.

6. The preparation method according to claim 5, wherein, the pH regulator is hydrochloric acid.

7. The preparation method according to claim 1, wherein after the chemical grafting reaction, a post-treatment is further performed;
the post treatment comprises coating a film of the reaction solution and drying the reaction solution.

8. The preparation method according to claim 7, wherein, the temperature of drying is 60-120° C., and the time is 10 min-30 min.

9. The preparation method according to claim 1, wherein, the mole percentage of the modifier with respect to a repeating structural unit of polyvinyl alcohol is 20%.

10. The preparation method according to claim 1, wherein, the mole percentage of the modifier with respect to a repeating structural unit of polyvinyl alcohol is 20%; and the mass percentage of polyvinyl alcohol in the polyvinyl alcohol solution is 6%.

\* \* \* \* \*